(No Model.)
E. B. SMEAD.
DETACHABLE FENDER FOR VEHICLE WHEELS.
No. 473,971. Patented May 3, 1892.
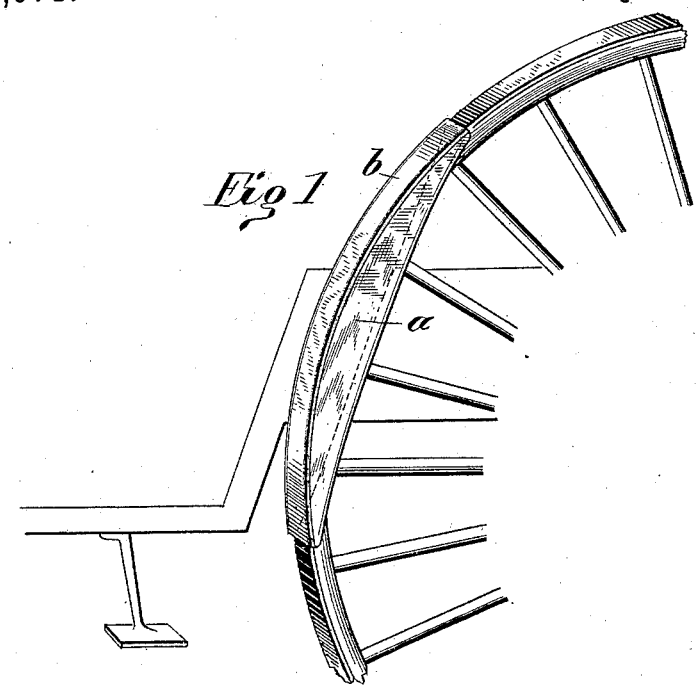
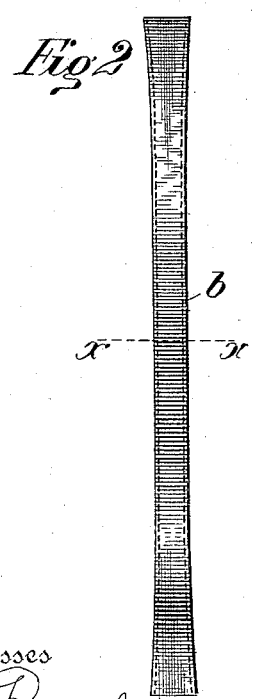
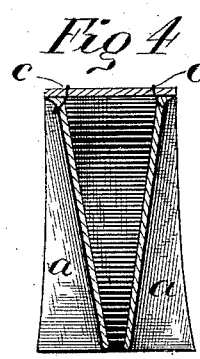
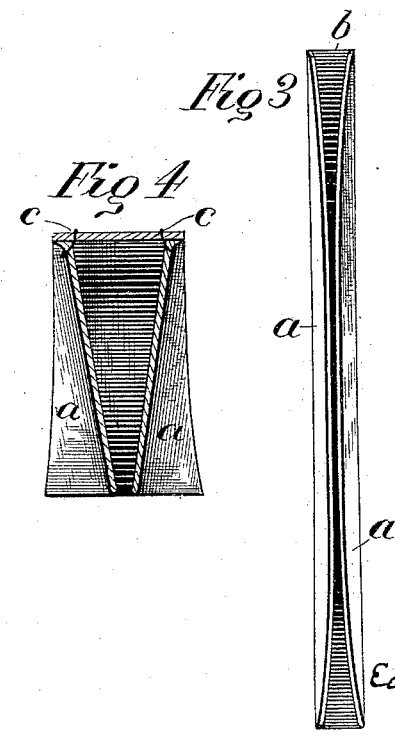
Witnesses
C. E. Burdine
K. E. Rodgers
Inventor
Edwin B. Smead
By Chas. S. Rogers
Attorney

United States Patent Office.

EDWIN B. SMEAD, OF HARTFORD, CONNECTICUT.

DETACHABLE FENDER FOR VEHICLE-WHEELS.

SPECIFICATION forming part of Letters Patent No. 473,971, dated May 3, 1892.

Application filed October 23, 1891. Serial No. 409,628. (No model.)

*To all whom it may concern:*

Be it known that I, EDWIN B. SMEAD, a citizen of the United States, residing at Hartford, in the county of Hartford and State of Connecticut, have invented certain new and useful Improvements in Detachable Fenders for Vehicle-Wheels; and I do hereby declare the following to be a full, clear, and exact description of the invention, such as will enable others skilled in the art to which it appertains to make and use the same.

My invention relates to certain new and useful improvements in guards or fenders adapted to be applied to the wheels of vehicles in order to protect the garments of persons entering or leaving the vehicle from contact with the wheels.

The following is a specification, in which reference is had to the accompanying drawings, in which—

Figure 1 shows the guard or fender when in position upon the wheel of a carriage. Fig. 2 is a front view of the same. Fig. 3 is a rear view of the same. Fig. 4 is a transverse section upon the line $x\ x$ of Fig. 2.

Similar letters refer to similar parts throughout the several views.

The fender or guard is made of stiff leather or other suitable material in the form of a segment, and is composed of three separate pieces—namely, the front $b$ and the two segmental sides or flaps $a\ a$. The front $b$, Figs. 1 and 2, is composed of a single piece of leather or other material, the outer edges of which are concave, thus rendering the middle on the line $x\ x$ narrow, while it gradually widens toward the ends, Fig. 2. This peculiar construction of the front $b$ renders the attachment of the guard or fender upon the felly of the wheel more secure, as the closer the under side of the front $b$ approaches the tire of the wheel the more securely will the fender become clamped upon the wheel. The sides $a\ a$ of the fender are segmental in shape and are sewed upon their inner edges—that is, stitched along their lower outside edge diagonally from the outside inwardly—to the front $b$, as shown in $c\ c$, Fig. 4, thus leaving their outer edges loose from the front $b$ and causing the segmental sides $a\ a$ to incline inwardly upon the front $b$, as if hinged thereon, and to approach nearer each other toward their outer edges, as is shown in $a\ a$, Fig. 3. Thus the sides $a\ a$ form a clamp, which, acting upon the wheel, holds the fender or guard in the desired position. The peculiar construction of the front $b$, before mentioned, and the tendency of the segmental sides $a\ a$ to incline inwardly and to approach each other produce sufficient frictional contact between the inner surface of the fender and the wheel to sustain the fender in any position upon the wheel.

To use this guard or fender, first place the fender upon the periphery of the wheel and then press it down upon the wheel until the segmental sides $a\ a$ impinge against the wheel, and thus secure it in the desired position. When the fender is in position upon the wheel, persons may enter or leave the carriage without danger of soiling the clothes from contact with the wheels, and when it is desired to remove the fender from the wheel this can easily be done by pulling it off the wheel.

The improved fender or guard, as herein described, is easily made, is durable, and efficiently serves the purpose for which it was constructed.

I am aware that prior to my invention guards or fenders have been made to protect the coat or other wearing-apparel from contact with the wheels of vehicles. Hence I do not claim this broadly; but What I do claim, and desire to secure by Letters Patent, is—

A detachable guard or fender for the wheels of vehicles, composed of a front $b$, the edges of which are concave, which makes said front narrower along the line $x\ x$ than at the ends, and segmental sides $a\ a$, sewed diagonally from the outside inwardly to the front $b$, said guard or fender retaining position upon the wheels by means of frictional contact produced by the peculiar clamping construction of the device.

In testimony whereof I affix my signature in presence of two witnesses.

EDWIN B. SMEAD.

Witnesses:
 ROBERT C. LAWSON,
 E. B. DILLINGHAM.